INVENTOR
N. R. SHAER
BY
William F. Simpson
ATTORNEY

Oct. 5, 1965 N. R. SHAER 3,210,476

AUTOMATIC SWITCHING CIRCUITS FOR ESTABLISHING CONFERENCE CONNECTIONS

Filed Oct. 30, 1961 5 Sheets-Sheet 2

INVENTOR
N. R. SHAER
BY William F. Simpson
ATTORNEY

Oct. 5, 1965 N. R. SHAER 3,210,476

AUTOMATIC SWITCHING CIRCUITS FOR ESTABLISHING CONFERENCE CONNECTIONS

Filed Oct. 30, 1961 5 Sheets-Sheet 3

INVENTOR
N. R. SHAER
BY William F. Simpson
ATTORNEY

INVENTOR
N. R. SHAER
BY William F. Simpson
ATTORNEY

Oct. 5, 1965 N. R. SHAER 3,210,476
AUTOMATIC SWITCHING CIRCUITS FOR ESTABLISHING
CONFERENCE CONNECTIONS
Filed Oct. 30, 1961 5 Sheets-Sheet 5

INVENTOR
N. R. SHAER
BY William F. Simpson
ATTORNEY 3,210,476

AUTOMATIC SWITCHING CIRCUITS FOR ESTABLISHING CONFERENCE CONNECTIONS

Norman R. Shaer, River Plaza, Middletown Township, Monmouth County, N.J., assignor to Bell Telephone Laboratories, Incorporated, New York, N.Y., a corporation of New York Filed Oct. 30, 1961, Ser. No. 148,525
14 Claims. (Cl. 179—18)

This invention relates to automatic telephone switching systems and more particularly to arrangements and means for automatically setting up multiparty or conference connections or calls in comprehensive automatic telephone switching networks.

It has been previously proposed to set up conference connections in small switching exchanges such as PBX's and individual central offices.

In these prior systems, two different procedures have been proposed. In accordance with one procedure a preliminary number or code is dialed followed by the directory number or codes of each of the subscriber stations which it is desired to include in the conference. In accordance with some arrangements the preliminary number or code must precede each of the directory numbers or codes of the individual stations forming the conference connection, while in other arrangements the dialing of this preliminary code once is sufficient.

In accordance with other arrangements where the same stations are desired to be repeatedly included in a conference group, a specific code or directory number is assigned to each conference group of stations. In accordance with this arrangement the single code or directory number is dialed each time it is desired to include the specific group of stations in the conference call.

The prior systems and arrangements have all been applied to individual switching centers and are not applicable to a large comprehensive switching network involving many switching centers such as employed in present nationwide direct distance dialing systems which may also extend to foreign countries.

It is an object of the present invention to provide apparatus and circuitry which will permit a conference or multiparty call to be established automatically in response to dial codes or numbers in a large comprehensive switching network such as a direct distance dialing switching network of the Bell System which involves a large plurality of switching centers or exchanges. These switching centers or exchanges may be of any of the various types including manual, step-by-step, crossbar, panel, electronic and other types.

In accordance with this invention arrangements are provided to permit a subscriber to dial a given code for given group of stations to be connected together in a conference circuit. Each time this code is dialed the same group of stations will be interconnected for a conference call. If it is desired to make conference calls to different groups of stations, it is necessary for the subscriber to dial different conference codes, a different conference code being required for each different group of stations to be included in a conference call.

Upon dialing of such a code, switching equipment will connect the calling subscriber to one set of terminals or one leg of a multiterminal transmission bridge or conference circuit, and then a conference program circuit which comprises a preset register or storage device, and is in turn thereupon set in operation. This preset register then automatically initiates a plurality of calls by generating preassigned codes or numbers. One such code or number is in effect transmitted for each call to be set up by the preset register. The preset register is arranged to initiate a call for each of the additional active sets of terminals or legs of the multiterminal transmission circuit or bridge. These calls may extend through the switching network to individual conference stations through any number of switching centers or they may extend to other multiterminal transmission circuits or bridges located at other switching centers where additional conference program circuits which also comprise preset registers are located and cause additional calls to be initiated by transmitting signals representing additional numbers to other stations to be included in the conference connection. One such call is originated for each of the other required legs of the multiterminal transmission or conference bridge circuits in the respective stations which are to be employed in the conference connection. These additional calls may extend to individual stations through the switching network at the switching center in which the multiterminal transmission circuit is located, or they may extend through other switching centers. The above-described automatic origination of calls may be repeated when necessary or convenient to set up conference connections to the desired conference subscriber stations through the necessary switching centers.

A feature of this invention relates to conference program circuits comprising a preset register which may be selected in response to a dialed code and which register will thereupon initiate a plurality of calls and transmit predetermined codes for the different calls initiated thereby.

Another feature of this invention relates to circuit arrangements for employing such a preset register at the originating switching center.

Another feature of the invention relates to employing such preset registers at other switching centers, which preset registers are selected by certain of the codes dialed or transmitted by the preset register at the switching center to which the originating subscriber is connected.

Another feature of this invention relates to selecting a multiway connection circuit and also a preset register circuit in response to a dialed code designating a conference call.

Another feature of this invention relates to circuits responsive to the seizing of a multiway transmission conference circuit for initiating the operation of a conference program or preset register circuit individual to said multiway circuit.

Another feature of this invention relates to control circuits for indicating to the conference originator that all of the stations desired in the conference have been interconnected and have responded to the conference call directed to them and are ready for the conference to proceed.

Another feature of the invention is directed to maintaining an indication before the conference originator that all of the stations included in the conference have responded to the call until all of the conference stations have been disconnected.

Another feature of the invention relates to the use of the conference switching arrangement in accordance with this invention for the automatic establishment of private wire communication systems in place of such system or as substitutes for such systems when they fail or become inoperative.

Another feature of this invention relates to the use of multiway systems automatically established by arrangements in accordance with this invention for establishing private wire switching communication systems in which the switching and supervisory signals are transmitted by voice frequency signals over the system thus automatically set up.

Another feature of this invention relates to auxiliary trunk circuits for extending a conference connection automatically through manually controlled switching centers.

The foregoing and other objects and features of this invention may be more readily understood from the following description when read with reference to the drawing, in which.

Figure 6:
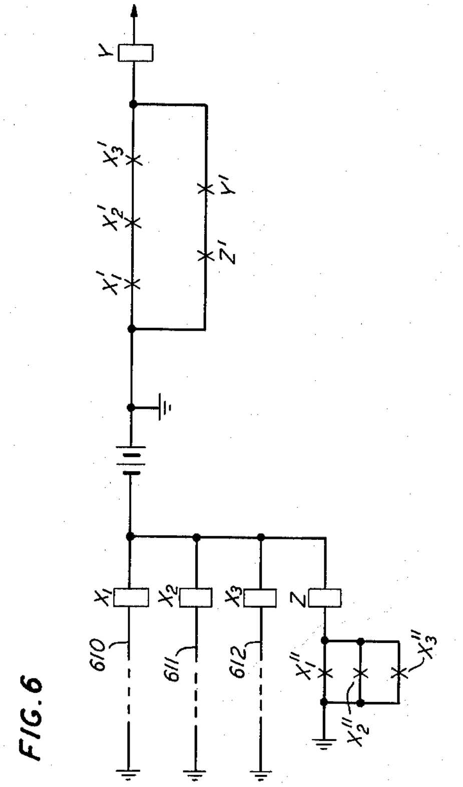
Figure 5:
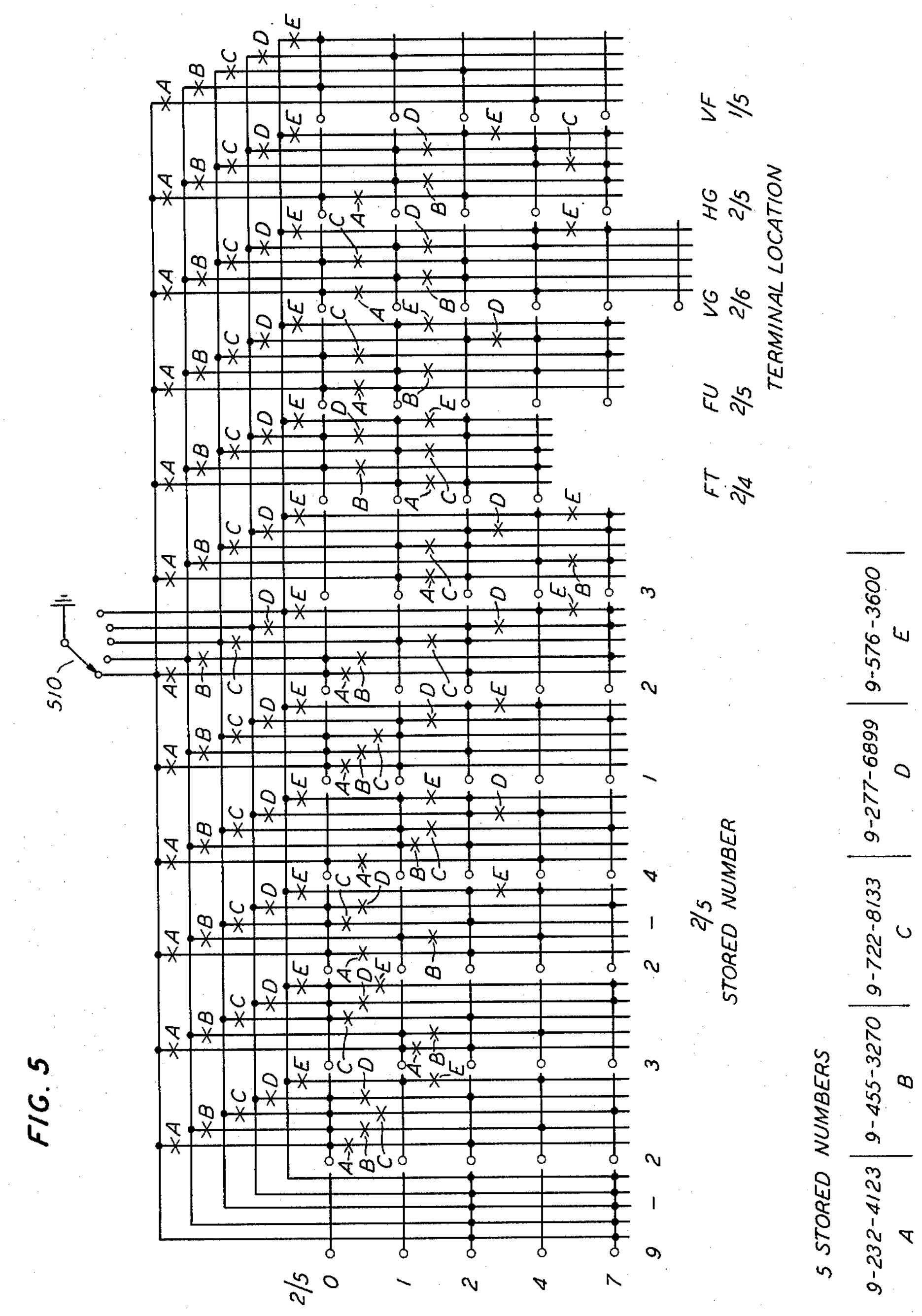

FIG. 5 shows a typical preset register circuit for initiating auxiliary calls and dialing or transmitting auxiliary codes in order to set up different branches of the conference call; and FIG. 6 shows a typical "And" circuit which is located at each of the switching centers at which a plurality of of branches of the conference call terminate. Such "And" circuits form, in effect, part of the supervisory or control circuits indicating to the conference originator that the conference call has been established so that the conference may be begun.

Figure 1:
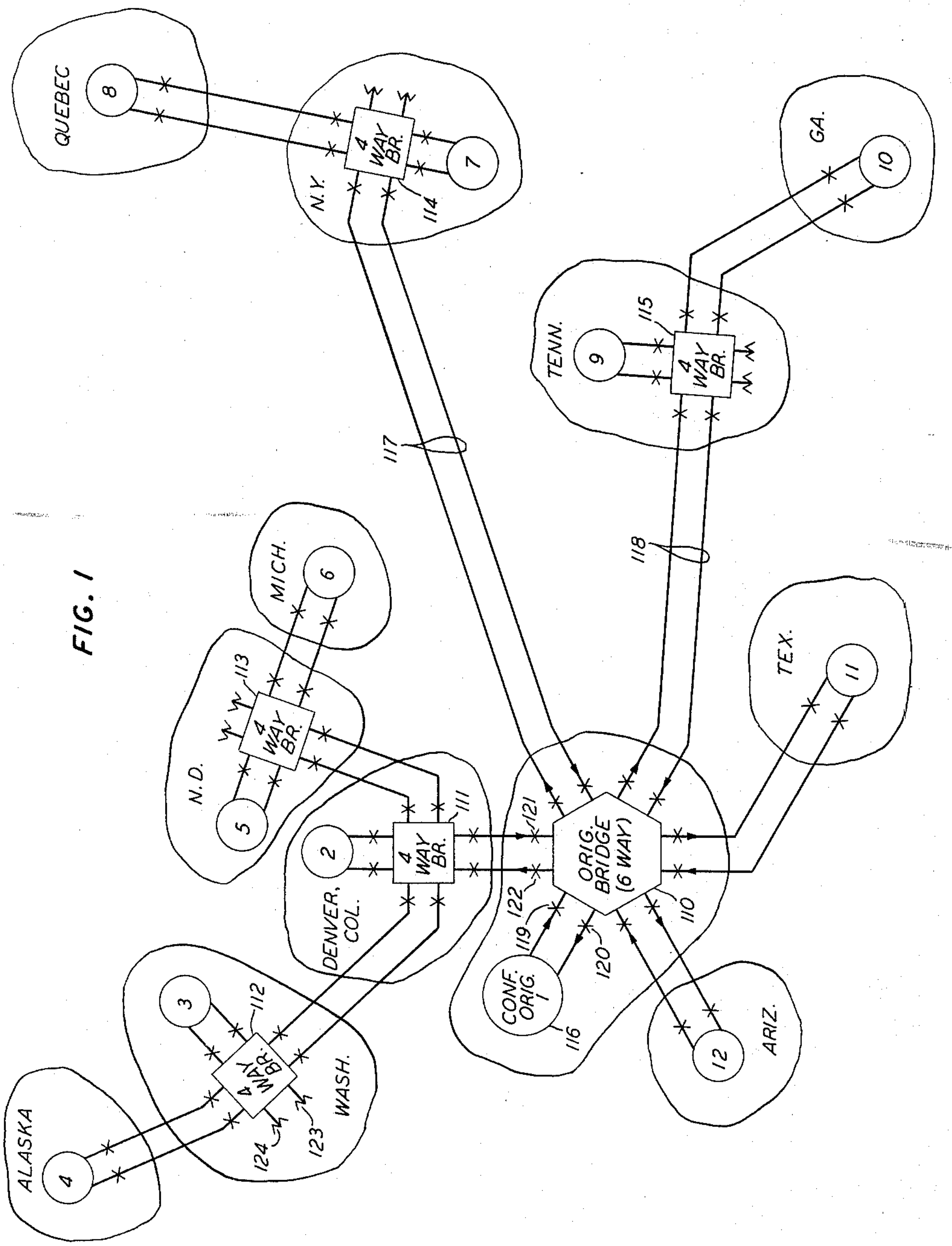
FIG. 1 illustrates a typical conference call which may be automatically established in accordance with my invention.

FIG. 1 shows a typical conference call which may be automatically set up by the arrangements provided in my invention. This conference call is assumed to include twelve stations. The first station 116 is the subscriber's station which is arranged to initiate the conference call. This station is connected to a central switching station at which the originating conference bridge 110 is located. Station 116 is connected to one leg or set of line terminals of this originating conference bridge circuit by means of contacts or switches 119 and 120. As shown in FIG. 1 the originating station and all of the other transmission paths are shown to be two-way voice frequency communication paths. These two paths may be two-way paths on the same pair of wires and in the same frequency range as is usual for local subscriber stations or they may be two paths or so-called four-wire transmission paths employed for long distance toll communication circuits. The conference bridge 110 may be of any suitable type which permits two-way communication between the appropriate channels of all of the lines or channels connected thereto. Thus transmission may be received on any one of the channels and transmitted to all of the rest of the channels. This conference bridge may include amplifiers and various forms of echo suppressing devices including voice actuated echo suppressing devices. Typical multiway of conference connection of circuits are shown in United States Patent 1,623,095, granted to G. Crisson et al. on April 5, 1927; Patent 2,019,603, granted to C. W. Green on November 5, 1935; Patent 2,035,536, granted to F. A. Cowan et al. on March 31, 1936; and Patent 2,154,579, granted to J. A. Parrott, April 18, 1939. When a greater number of terminals are required, two or more of the circuits shown in the above patents may be connected together.

The conference call is assumed to include the conference originator station 116, the subscriber's station 2 in Denver, Colorado, another subscriber station 3 in the State of Washington, the No. 4 subscriber station shown in Alaska, the No. 5 in North Dakota, and the No. 6 in Michigan. These five stations are all interconnected with one leg of the originating conference bridge 110 through the various transmission lines and the subsidiary conference bridges 111, 112 and 113, each of which is located at a different switching center. The conference station 7 in New York and station 8 in Quebec are reached over another transmission path from the originating conference bridge 110. Similarly, station No. 9 in Tennessee and No. 10 in Georgia are interconnected with the transmission path 118 from the originating conference bridge 110. Two additional individual stations are connected to the conference bridge namely station 11 in Texas and station 12 in Arizona.

As shown in FIG. 1, the originating conference station 116 is connected through the switching network to one of the sets of terminals of the originating conference bridge 110 and each of the other five legs or sets of line terminals of the original conference bridge 110 comprises a two-way transmission path which may be a single pair of wires or may be two separate transmission paths, sometimes called four-wire transmission. These transmission paths may include transmission channels of various types of carrier current. They may include open wire lines, cable conductors, coaxial cables, waveguides, channels in radio relay systems, or radio channels. As will be explained, these paths are set up through the switching equipment, and certain of the switching contacts are represented by crosses (i.e., *x*'s) on the various lines or wires. However, these communication paths or channels may also include other switching centers of the direct distance dialing network and any other switching network which may be interconnected with the direct distance dialing network.

Typical conference calls may also include other stations in other countries which may be reached over radio links to these foreign countries and then through the telephone switching networks of the respective countries.

When a conference call includes stations in foreign countries, it may be desirable to extend the call to the foreign stations through manually operated switching devices or switching stations by means of auxiliary trunk circuits as described herein. Such connections are not shown in specific conference call shown in FIG. 1. However, stations in foreign countries may be included in other typical conference calls in the same manner as described herein.

The vairous multiterminal conference circuits shown in FIG. 1 such as 110, 111, 112, 113, 114, and 115 are assumed to be located at different automatic switching centers. These switching centers may be of the types shown in one or more of the following patents: Patent 2,585,904 granted to A. J. Busch on February 19, 1952; Patent 2,868,884 granted January 13, 1959, to J. W. Gooderham, E. Jacobitti, O. Myers, F. F. Shipley and W. B. Strickler; or the four-wire No. 5 crossbar switching system such as shown in a patent application of J. W. Gorgas, G. A. Hurst, J. S. Pfrommer, and W. H. Scheer, Serial No. 134,633, filed August 29, 1961 now issued as Patent 3,150,236, September 22, 1964. In addition, the communication paths between these switching centers may include additional switching centers in accordance with the disclosure of any of these patents or of any other type of switching center which may be interconnected with such switching centers.

In establishing such a communication path the originating subscriber will dial a preassigned directory number or code designating the desired group of stations to be included in the conference call. This information is transmitted to the central switching station where the path through the switching network represented by contacts 119 and 120 is set up between the conference originating subscriber station 116 and one set of line terminals or legs of the six-way conference bridge 110. When the bridge is seized, a preset register is activated at this switching center which in turn initiates five calls one after the other, one call for each of the legs or sets of line terminals, and causes a preassigned or predetermined code, such as the directory number, to be transmitted over the line terminals or legs of this originating conference bridge. Thus the first call, for example, initiated by the conference program circuit or preset register will cause the connection to be set up from the conference bridge 110 through the switching network represented by contacts 121 and 122 at this switching station to a transmission path extending to a similar switching station at Denver, Colorado. Here, as a result of the initiation of a call over this transmission path, contacts through the switching network at Denver are closed which ultimately cause the transmission path to extend to one set of terminals of a four-way conference bridge 111 located at this station. In addition, another preset register located in this switching center is activated in response to this call and this preset register initiates three other calls. Assuming the first of these calls is directed to station 2 at Denver, the preset register will generate the directory number of this station and cause a path through the switching network to be closed from one set of line terminals of the conference bridge 111 to station 2. Next, a second call will be initiated by the preset register and as a result another communication path will be set up from the four-way bridge 11 to another station or switching center such as the switching center shown in the State of Washington. A predetermined number will also be originated by this second preset register and transmitted over this path with the result that a communication path is set up through the switching network at Denver and through the switching network at Washington to still another four-way conference bridge 112. In addition, a third preset register is set into operation in the switching office in the State of Washington. This register then initiates a call which causes a path to be set up through the switching network at Washington to station 3 also assumed to be in the State of Washington. When the conference program circuit or preset register has completed its operations with respect to this call the preset register initiates another call and a number is thereafter transmitted from this third preset register which causes a transmission path to be set up to station 4 at Alaska. As indicated in FIG. 1, only three of the possible four lines from the four-way bridge 112 are actually employed in the conference arrangement shown in FIG. 1; the fourth arrangement is terminated, as shown, by the W symbols 123 and 124 on the drawing. These symbols represent proper terminating impedances so that the voice frequency signals may pass from any one of the other three legs to each of the other two legs of this conference bridge.

Upon the setting up of the call to the switching center at Washington and the transmission of a preassigned number thereover, the second of the above-described preset registers which is located in Denver, Colorado will initiate a third call which causes the transmission path to be set up from the fourth set of terminals of the four-way bridge 111 and transmitted to a switching center in North Dakota. The preset register in Denver, Colorado will cause the transmission of still another preassigned directory number or code over this transmission path which causes a communication path to be set up between the four-way bridge 111 and the four-way bridge 113. In addition, a fourth preset register will be seized which in turn initiates two calls similar to the preset register located in the Washington central office. This third preset register is shown located in the switching center in North Dakota. The operation of this switching center causes communication paths from this bridge 113 to be set up to the station 5 in North Dakota and 6 in Michigan.

As shown for the switching station 4 and switching station 6, additional switching centers are located in Alaska and Michigan, respectively, through which communication paths are automatically set up in response to the codes sent over these communication paths from the respective preset registers located in the States of Washington and North Dakota.

The above described calls are all initiated and set up in response to the first call initiated by the first preset register located in the switching center to which the originating conference station is connected. After the initiation of this call and the transmission of the proper preassigned or predetermined code or directory number over this channel, the preset register at this location will initiate a second call over the transmission circuit 117; a path is thus set up from the originating bridge 110 to this transmission path which will then be extended to the four-way conference bridge 114 located in New York. Thereafter, a number will be sent over this transmission path to a switching center in New York and as a result a preset register will be seized and set into operation in New York. This conference program circuit or preset register initiates two calls and causes the transmission path 117 to be extended to the conference station 8 in Quebec in response to one of the calls and to station 7 in New York in response to the other of these calls. Here again the transmission path to the station in Quebec extends through paths in the switching network which are automatically established in Quebec.

The third call initiated by the originating conference circuit will cause a connection to be set up over the transmission path 118 and to the conference bridge 115. Still another preset register located in Tennessee adjacent this conference bridge causes two calls to be initiated. In response to one of these calls, a transmission path from the transmission circuit 118 is extended to station 9. In response to the other call, a transmission path is extended from the transmission circuit 118 to station 10 in Georgia. In this case, as for stations 4, 6, and 8, the transmission path extends through additional switching centers or equipment located in Georgia.

The last two conference calls initiated by the originating conference equipment causes transmission paths from legs or line terminals or conference bridge 110 to be extended to station 11 in Texas and to station 12 in Arizona. In each of these cases a transmission path is automatically set up through switching equipment in Texas for the call to station 11 and through switching equipment in Arizona for the call to station 12.

When all of these connections have been set up and the subscribers at the various stations have answered or responded to the various calls and codes transmitted over the respective transmission channels, a signal is transmitted to the conference originating subscriber's station 116 indicating that the establishment of the call has been completed to all of the stations of the conference group whereupon the subscriber of this station may initiate the conference and speech originating at any of the stations can be transmitted to all of the stations.

Various solutions may be employed to problems encountered when any of the stations of the conference group are busy on prior calls. For example, the conference calls may be directed to unlisted stations to which only group conference calls are directed. In case a switching system comprises the four-wire No. 5 system, the conference calls may be preceded by a digit designated the pre-empt operation in which case the busy circuits are seized and previous calls thereover are dismissed. In addition, if the station is busy the so-called camp-on feature may be employed which will extend the connection to this station when it becomes idle.

At the termination of the conference call, each of the conference stations will hang up or terminate the call thereat and when all of them have so terminated their call the signal at the conference originating station 116 is cancelled. Thus if a light is lighted to indicate the completion of the conference call to the station as described above, this lamp may be extinguished at the termination of the conference when all of the stations have hung up.

Figure 2:
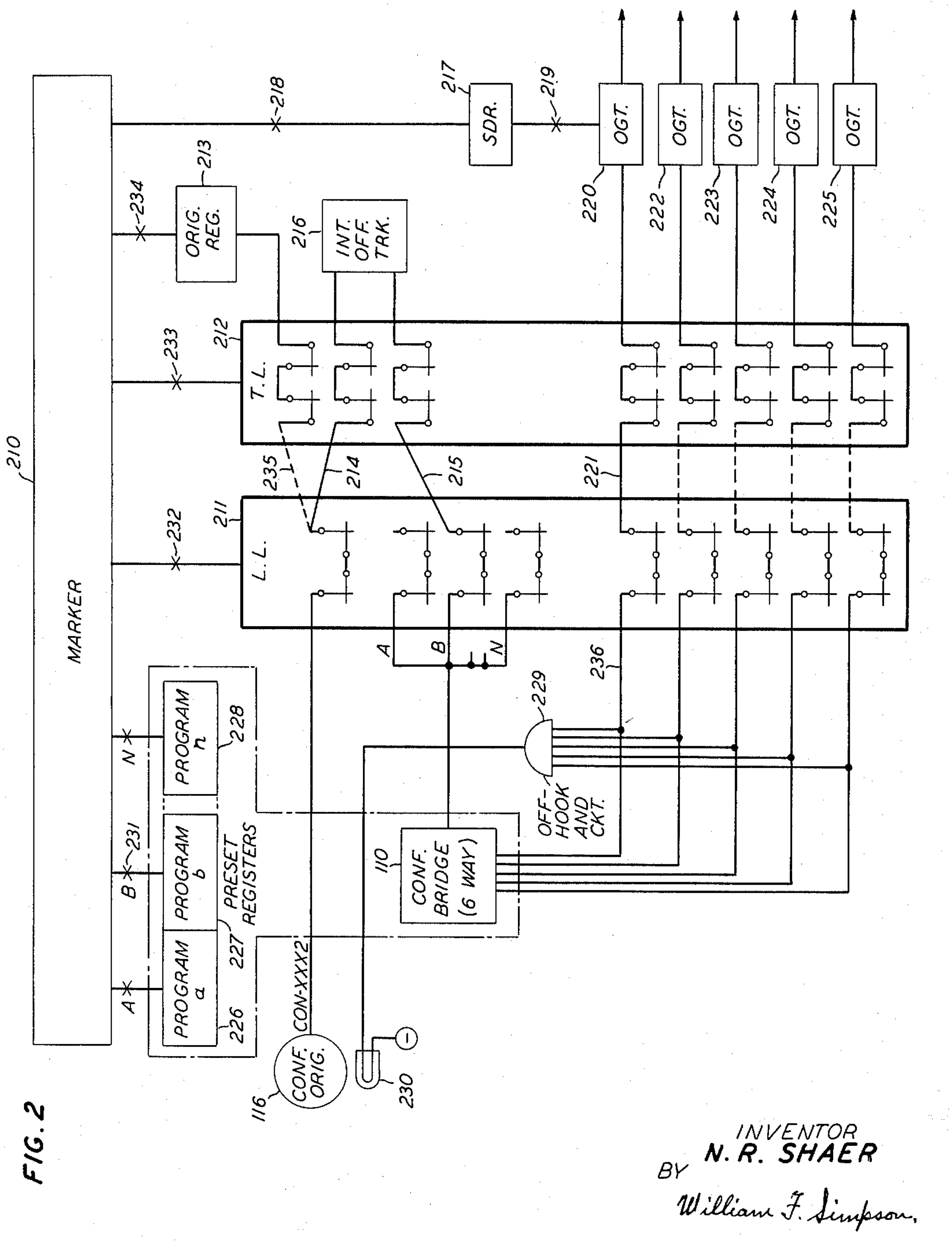
FIG. 2 illustrates a typical arrangement in accordance with my invention at the switching center to which the conference originator is connected.

FIG. 2 shows in greater detail the circuits at the switching station to which the conference originating subscriber 116 is connected. As indicated above, this switching system is a crossbar type switching system such as disclosed in the above-identified patents and applications. Only those portions of such systems as are essential to the understanding of this invention have been represented in FIG. 2. The other portions of such systems are employed in their usual or normal manner. The main elements comprise the line link frame 211, the trunk link frame 212 and marker 210. Other circuits such as an originating register 213 and an intraoffice trunk 216, sender 217 and outgoing trunk circuits 220 and 222 through 225 are also represented in this figure. In addition, numerous of the various connector circuits for establishing paths between the various frames and circuits are represented by crosses or *x*'s, such as 218, 219, 232, 233, and 234, in the various conductors.

When it is desired to make a conference call, the subscriber at station 216 will initiate a call by removing the instrument from its support, this causes a signal to be transmitted to the central office equipment shown in FIG. 2 in the normal manner whereupon the marker circuit causes a connection to be established from the subscriber's station line over the transmission path or junctor 235 and through the line link frame 211 and the trunk link frame 212 to the originating register 213. Inasmuch as the operation of the system at this time is substantially as described in the above-identified patents, the operation of all the detailed circuits is not repeated herein.

When the subscriber at station 116 receives dial tone, he may dial a conference call code. This code will then be entered in the originating register 213. When the complete code or a sufficient portion thereof has been entered in the originating register 213, the originating register will again call in the marker circuit 210 and cause the marker connector contacts 232, 233, 234 to be closed and a connection set up to the conference bridge 110. In this case, if the marker is called in after a portion of the code is dialed, the marker may either be prepared to set up operations of the system or instruct the originating register to call in the marker after the complete code has been dialed.

After the information in the originating register necessary to select the proper conference program circuit or preset register, such as 227 and a conference bridge circuit such as 110, has all been transmitted to the marker 210, the connection over the path 235 from a subscriber's line to the originating register 213 may be released and these circuits restored to normal.

At such time as sufficient information for the operation of the system has been received, the marker will then cause the originating subscriber's line to be connected over the transmission paths 214 through the line link frame 211 and a trunk link frame 212 to the intraoffice trunk 216. A connection will also be set up from this intraoffice trunk through the trunk link frame, transmission path or junctor 215 and the line link frame 211 to one set of line terminals or legs of the conference bridge circuit 110. This set of line terminals or legs is frequently called the input line terminals of this bridge merely for convenience. It is substantially the same as all of the other sets of line terminals.

Only one conference bridge circuit is shown in FIG. 2. However, if a sufficient large number of conference calls is to be established, a plurality of such conference bridge circuits will be provided and the marker will cause a proper or idle one to be selected.

The marker circuit in addition to establishing a connection from the subscriber station 116 through the switching network to the conference bridge 110 as described above also causes, by its seizure of the bridge, one of the program preset registers such as 227 to be selected according to the conference code dialed by the subscriber.

In accordance with one specific embodiment of my invention requiring substantially no changes in the marker circuit's functions or operation a plurality of conference program or preset register circuits are provided for an individual to each conference bridge circuit. The conference bridge circuit is provided with a set of line link terminals for each conference program circuit. The tip terminals of all of these sets of terminals are connected together. The ring terminals are similarly connected together. A relay is provided for each of the sleeve terminals. This relay is operated when the conference circuit is seized via its set of terminals. This relay in operating makes all of the other terminals busy and initiates the operation of the corresponding conference program or preset register circuit.

The preset register such as 227 will cause the connnector contacts 231 to be closed whereupon this register will initiate the necessary auxiliary calls and transmit code signals to the marker which in turn causes corresponding signals to be sent over the outgoing trunks when necessary. Details of a suitable preset register are shown in FIG. 5. Here a cross-connecting field is represented having a plurality of vertical columns one for each digit of the stored number and a plurality of horizontal lines or conductors each one of which represents one code element of a two-out-of-five code employed to represent each of the various numbers stored in this location. The black dots represent cross-connections between the vertical line and the horizontal output terminals. A selector switch 510 is shown which is employed to select one of the various codes or numbers stored in this cross-connection field. In addition, a group of relays, the contacts of which are represented by A, B, C, D, and E, are provided for applying ground to the proper set of conductors so that the desired code will appear on the open circuit in each of the vertical columns. The first eight columns starting on the left are employed to represent the dialed code to be employed in setting up the first call. If this code requires more than eight digits, then additional columns will be provided as indicated by the dash between the first and second columns from the left and between the fourth and fifth columns from the left. The remaining columns are employed to store or indicate the equipment number of the different output legs of the conference bridge 110. Thus on the first call the switch 510 will be actuated to the position shown and relay A operated so that the proper code will be transmitted to the marker circuit 210 and thereafter the equipment number of the first output set of line terminals 236 from the conference bridge 110 as it appears on the line link frame 211 will be transmitted to the marker circuit 210. As a result, the marker will have all the information necessary to then set up a connection between the line terminals 236 and a proper outgoing trunk circuit such as 220. In addition an idler sender 217 is selected and connected by means of suitable connector switches such as 218 and 219 to the marker circuit and to the outgoing trunk circuit 220. The marker circuit will then set this sender circuit 217 to transmit the proper code over the outgoing trunk circuit. Thereafter, the marker circuit will be disconnected and the sender circuit 217 will transmit the proper code for the outgoing line circuit to a distant switching center.

At this time the conference program circuit or preset register circuit 227 will be advanced and initiate a second call. As a result, the marker circuit 210 will gain be connected with this program circuit and the proper code transmitted thereto. This code will be the second of the numbers or codes as illustrated in FIG. 5. Upon the advancing of the program or register circuit 227, the switch 510 will be stepped to its second position, relay A released and relay B operated. As a result, the second number will be transmitted to the marker circuit 210 whereupon a connection from the second output set of line terminals from the conference bridge circuit 110 will be set up to a second outgoing trunk circuit 222. At this time a sender will also be associated with this trunk circuit and also with the marker and as a result cause a proper code to be transmitted over this trunk circuit. In transmitting the codes over the various outgoing trunk circuits the senders attached thereto will transmit the complete code given to it by the marker circuit and thereafter be disconnected and returned to its normal or idle condition where it will be available for use in cooperation with other trunk circuits. Such operation of the sender circuit is the same as in the system described in the above-identified patents.

In the above-identified manner a call is originated and a predetermined code transmitted to the marker circuit for each of the legs of the conference circuit to be employed on the particular conference call. As a result, connections will be successively set up from each of the active output legs of the conference bridge circuit 110 to proper outgoing trunk circuits. Where the call must be transmitted through additional switching centers the proper codes necessary to cause the equipment in these additional centers to set up the desired connections will be transmitted over these trunk circuits by means of senders temporarily connected thereto in the manner described above.

When a connection is set up directly to a conference station connected to the switching center represented in FIG. 2, then the marker will not call in a sender and no code will be transmitted over the line to the subscriber's station. Instead, an intraoffice trunk is selected and a ringing circuit will be attached and ringing current transmitted to the subscriber's station. Such opertaion is described in greater detail with reference to FIG. 3.

When an answer supervisory signal is received from all of the subscribers' stations over each of the trunk circuits, the off-hook AND circuit 229 will be actuated and cause lamp 230 to light or other suitable indication to be given to the subscriber at station 216, thus indicating that the conference call has been completely set up and that he may communicate with all of the stations of the conference group.

When all of the stations of the conference group have disconnected, the lamp 230 will be extinguished thus indicating to the subscriber station 116 that the conference connection has been completely taken down and the circuits restored to normal so that they may be used for another conference call.

Figure 3:
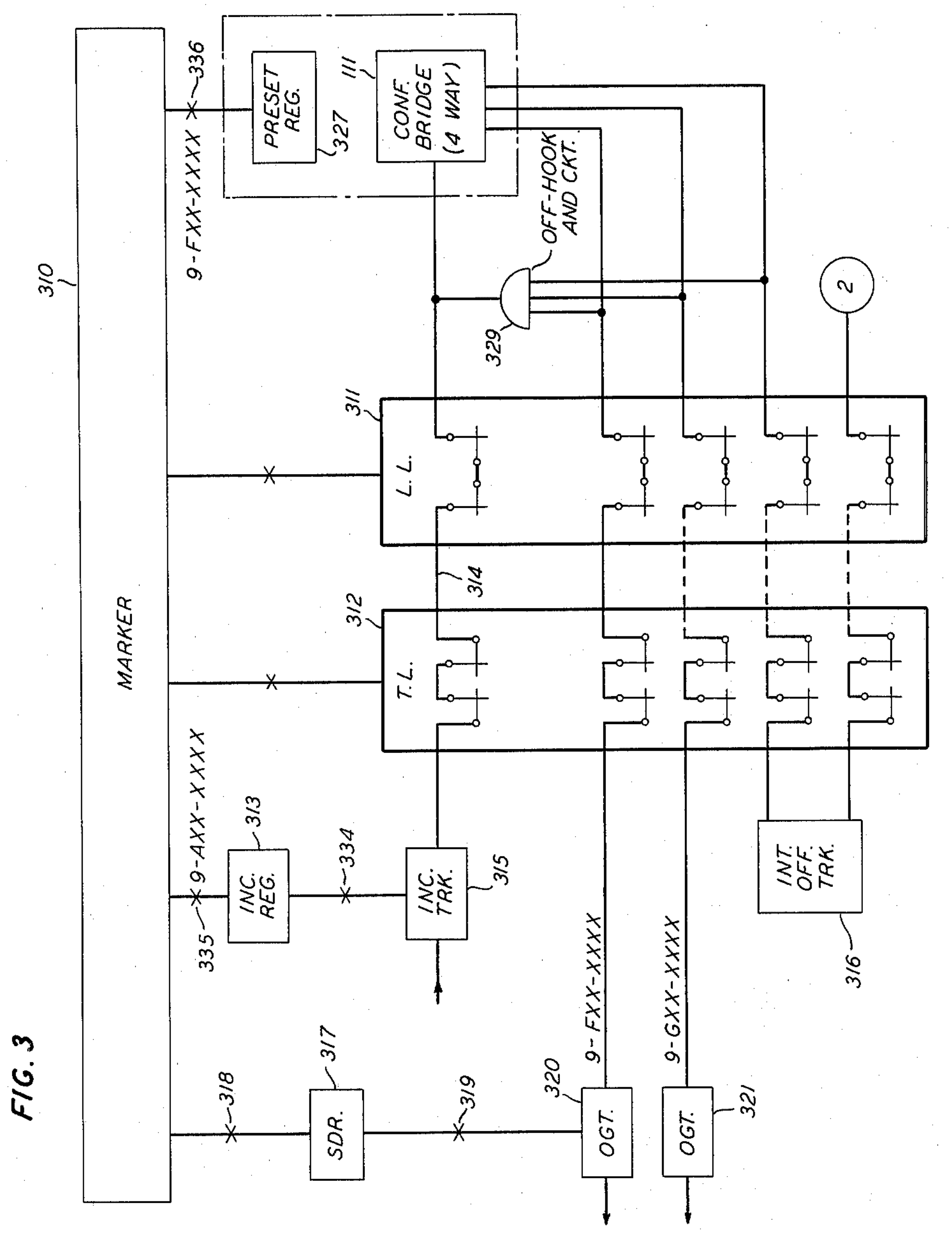
FIG. 3 shows an arrangement in accordance with my invention which is located at various other switching centers through which the branches of the conference call extend.

FIG. 3 shows in more detail the various circuits located at intermediate switching centers such as that in Washington, New York, Denver, North Dakota and Tennessee shown in FIG. 1. It is evident from FIG. 1 that all of these are not identical; some have more trunks extending from them than others. However, the manner of operation of the equipment is essentially the same at each of the various switching centers. As shown in FIG. 3 each of these switching centers comprises a crossbar system of one of the types described in the above-identified patents. These systems include the line link frame 311, trunk link frame 312, and marker 310 as well as various connectors for interconnecting the marker with other portions of the system. As shown in FIG. 3, incoming trunk 315 takes the place of the subscriber's line 116 at the originating station. A call from one of the outgoing trunks such as 220 of FIG. 2 will be received by the incoming trunk circuit 315. As described above, this call will be one of the calls initiated by the program preset registers such as 227 of FIG. 2. When the incoming trunk 315 is seized, an incoming register will be connected thereto, to the connector contacts represented by 334. Thereafter, the code dialed out over the trunk 220, for example by the sender 217 as described above, will be transmitted either directly or through other switching centers including other senders to the incoming trunk circuit 315 over the various signaling paths such as shown in FIG. 1. This code is then registered in the incoming register 315. When this number or code is registered in this incoming register, the marker will be called in and cause the marker connector contacts 335 to close and as a result both the equipment number of the trunk 315 and the incoming code or dialed number will be transmitted to the marker 310. Similarly as in FIG. 2, the marker will respond to these codes and cause a connection to be set up through the trunk link frame 312 and path 314 and line link frame 311 to the incoming leg or set of line connections of the conference bridge 111. In addition, a preset register 327 similar to the register 227 of FIG. 2 is set into operation.

In FIG. 3 only one such preset register is shown instead of the *n* registers represented in FIG. 2. However, a plurality of these registers will be provided as required by traffic and conference call conditions desired. As a result of the operation of the register 327, the marker connector contacts represented by 336 will be closed. As a result, this register initiates a call and transmits to the marker 310 a predetermined code as well as the equipment number to one of the output legs of the bridge 111. The marker will then set up a connection through the line link frame 311 and the trunk link frame 312 to the outgoing trunk 320, for example. In addition, the connector contacts 318 and 319 will be closed and the desired code or dialed number transmitted to the sender 317. Thereafter, the marker will be dismissed and this sender will send this code over the outgoing link through the trunk circuit 320.

In addition, the preset register 327 will be advanced and initiate another call. Thereafter both a desired code or dialed number of another leg of the conference bridge 111 are transmitted to the marker. In a similar manner a connection will be set up to another outgoing trunk circuit 321 and the desired number or code transmitted over this trunk circuit. The above operation will be repeated as often as necessary or desired to initiate calls over each of the active legs of the conference bridge circuit 111. As shown in FIG. 3, two outgoing legs are connected to outgoing trunk circuits 320 and 321 while the third outgoing leg from this conference bridge circuit is connected to a local station such as 2. Station 2 may be permanently wired to the bridge requiring no switching.

Alternatively, a connection may be set up to station 2 through the switching network. In this case when the preset register initiates the call directed to station 2, the preset register circuit transmits to the marker the directory number of station 2 and the equipment number or location of the outgoing leg or terminals from the conference bridge 111 which is desired to connect to this station. As a result, the marker first selects an idle intraoffice trunk such as 316 and then establishes connections between a subscriber's station 2 in this trunk and between the desired leg of the conference bridge circuit 111 and this trunk circuit.

When answer signals have been received over all of the outgoing legs of the conference bridge 111, the off-hook AND circuit 329 will be actuated and send back a supervisory signal over the incoming line 315 to the outgoing trunk 220, for example, and then to the circuit 229. When corresponding supervisory signals are received over all of the other trunks from all of the other outgoing trunks of FIG. 2, the AND circuit 229 becomes active and causes lamp 230 to be lighted or some other signal sent to station 116.

A typical circuit suitable for use for the circuits 229 and 239, for example, is shown in FIG. 6. Here three incoming leads 610, 611 and 612 are shown extending to relays X1, X2, and X3. These relays will become operated when a supervisory answer signal is received from the corresponding lines or legs of the conference circuit to which these relays are connected. Each of these relays is provided with a corresponding contacts X1′, X2′, and X3′ so that when all of these contacts are closed and a circuit will be completed to the winding of relay Y, which relay will then be operated to transmit an answer signal over the corresponding incoming leg of the conference bridge circuit.

Each of the relays X1, X2 and X3 in addition to closing the contacts X1′, X2′ and X3′ also closes the contacts X1″, X2″ and X3″. As a result, so long as any one of these relays X1, X2 or X3 is operated, a circuit will be completed for maintaining relay Z operated. When both relays Z and Y have operated, then a holding path will be completed for the Y relay independently of the operation of all of the relays X1, X2 and X3. As a result, relay Y is not operated and in turn an answer supervisory signal is not transmitted back over the incoming trunk circuit or to the original subscriber until all of these relays are simultaneously operated. Thereupon the relay Y operates and completes the holding circuit described above so that these answering supervisory signals will be maintained so long as relay Z remains operated and relay Z will remain operated as long as any one of the relays X1, X2 or X3 is operated. When all of these relays have released, then relay Z will release and open the contacts Z1 thus allowing relay Y to release and interrupt the transmission of the answer supervisory signal back to the originating station.

Figure 4:
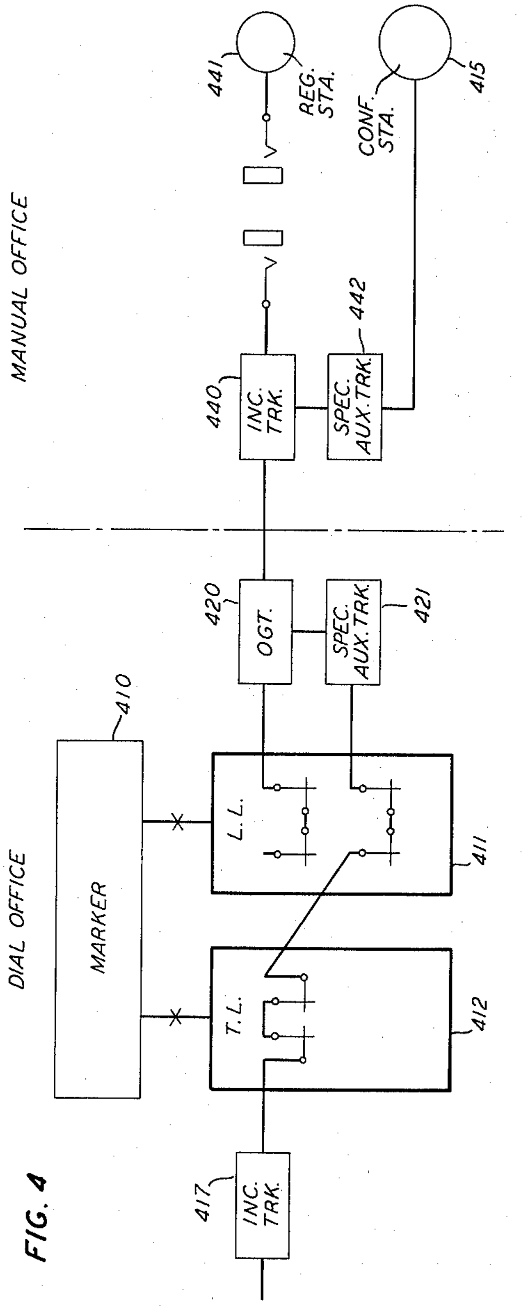
FIG. 4 shows an auxiliary trunk circuit in accordance with my invention for extending branches of conference calls through manual switching centers.

In case it is desired to include in the conference call a station normally served by a manual switching office, auxiliary trunks will be provided as shown in FIG. 4. Here a crossbar office is represented by the incoming trunk 417, the trunk link frame 412, and the line link frame 411. In addition, the marker 410 is employed to set up connections through this central office in the usual manner. On normal calls from the switching equipment in a dial office, the outgoing manual trunk 420 will be seized and extend the call through the incoming trunk circuit 440 to the manual office and then through the manual switching equipment to some station such as 441. However, on the conference call the code received over the incoming trunk 417 from the distant central office will cause the marker circuit to select the auxiliary trunk circuit 421 with the result that the call will be directed through the auxiliary incoming trunk circuit 442 in the manual office and then directly to the conference station 415. This conference station then responds as a normal subscriber's station to the conference call and supervision is returned in the usual manner; this ultimately contributes to lighting of the light 230 at the conference originating subscriber station in the manner described above.

When it is desired to include an overseas radio link in the conference connection the auxiliary trunk circuits of FIG. 4 through a manual switching office will usually be employed. The overseas radio link being connected through the manual switching office, either to the conference station 415 or else through a connection through the normal manual switching equipment at such a station.

In the foregoing description, it has been assumed that the conference was to take place between a predetermined group of subscribers' stations. In case a different group of subscribers' stations are to be included in the conference connection, then different codes will be dialed or transmitted from the originating subscriber's station and different preset registers selected and these different preset registers in turn will transmit different codes for the calls originated by them.

In addition, such conference connections may be considered to comprise private wire line communication systems and may be employed in place of such private line systems or in addition thereto when trouble develops in the private wire systems or when the private wire line systems become overloaded.

Such private wire line systems frequently include dialing and supervisory equipment which frequently employs voice frequency carrier signaling currents. Such dialing currents signals may be transmitted over a conference connection such as automatically set up in accordance with this invention. Thus, the conference connection through the nationwide dialing switching network takes the place of interconnecting transmission lines between the various stations such as a private wire switching system.

Such a conference network as described herein in addition to being employed for voice frequency transmission and conferences, may also be employed to transmit both telegraph and data signaling currents so long as these signaling currents comprise alternating currents having frequency in the voice frequency range or in the pass band frequency range of the various switching systems employed in setting up the connection.

The foregoing description is of a typical embodiment of this invention, the novel features of which are specifically described in the following claims appended hereto.

What is claimed is:

1. In combination in a telephone switching system, a subscriber's line, a conference circuit, means to establish a connection from said subscriber's line to said conference circuit, a conference program circuit, means for operating said conference program circuit, and means controlled by said conference program circuit for thereafter establishing a plurality of connections from said conference circuit to predetermined subscribers' stations.

2. In combination in a dial telephone system, subscribers' lines, a subscriber's station including a signaling transmitting device, a switching network, means responsive to signals transmitted from said subscriber's station for controlling said switching network, a multiterminal conference circuit, a conference program circuit, means responsive to a predetermined signal code transmitted from said subscriber's station for selectively connecting said subscriber's station to one of the terminals of said conference circuit and for actuating said conference program circuit, and means included in said conference program circuit for selectively directing said switching equipment to establish other connections to other terminals of said multiterminal conference circuit.

3. In combination in a telephone switching system a subscriber's station, a central switching station, a switching network means at said subscriber's station for transmitting calling signals for controlling said switching network, a multiterminal conference circuit in said central switching station, a plurality of conference program circuits, means responsive to predetermined calling signals transmitted from said subscriber's station for selectively connecting said subscriber's station to one of the terminals of said multiterminal conference circuit and for activating one of said conference program circuits, and means controlled by said conference program circuit for thereafter initiating a call for each of the other active teminals of said multiterminal conference circuit towards other subscribers' stations.

4. In combination in a telephone switching system, a multiterminal conference circuit, a conference program circuit, means responsive to said conference program circuit for selectively initiating calls from predetermined terminals of said multiterminal conference circuit, and means for transmitting predetermined signals under control of said conference program circuit for each of the calls initiated thereby.

5. In combination in an automatic telephone switching system, a plurality of subscribers' stations, a switching network, a multiterminal conference circuit, a conference program circuit, means controlled by said conference program circuit for initiating calls for predetermined terminals of said multiterminal conference circuit, and means controlled by said conference program circuit for transmitting switching signals therefrom for each of the calls initiated thereby for establishing connections to selected subscribers' stations.

6. In combination in a telephone switching network, a plurality of subscribers' stations, a plurality of central switching stations including switching networks, a multiterminal conference circuit located at one of said central switching stations, a conference program circuit also located at said one central switching station, means responsive to said conference program circuit for selectively initiating calls for predetermined ones of the terminals of said multiterminal conference circuit, and means for transmitting from said conference program circuit control signals for controlling the switching networks at said one central switching station and at other of said central switching stations for establishing connections from said predetermined terminals to selected subscribers' stations.

7. In combination in a telephone switching system, a call initiating subscriber's line, a conference circuit, means to establish a connection from said subscriber's line to said conference circuit, a conference program circuit, means for actuating said conference program circuit, means controlled by said conference program circuit for thereafter establishing a plurality of connections from said conference program circuit to predetermined subscribers' stations, and means controlled by response of all of the subscribers' stations for transmitting a signal to said call initiating subscriber's line.

8. In combination in a telephone switching system, a call initiating subscriber's line, a conference circuit, means to establish a connection from said subscriber's line to said conference circuit, a conference program circuit, means for operating said conference program circuit and means contolled by said conference program circuit for thereafter establishing a plurality of connections from said conference circuit to predetermined subscribers' stations, means controlled by response of all of the subscribers' stations for transmitting a signal to said call initiating subscriber's line, and means responsive to the completion of the call at all of said subscriber's station for transmitting another signal to said call initiating subscriber.

9. In combination in a telephone switching system, a telephone switching network, a multiterminal conference circuit, a conference program circuit, means responsive to said conference program circuit for initiating calls for predetermined terminals of said multiterminal conference circuit, and means responsive to the answering of all of said calls initiated by said conference program circuit.

10. In combination in a telephone switching system, a telephone switching network, a multiterminal conference circuit, a conference program circuit, means responsive to said conference program circuit for initiating calls for predetermined terminals of said multiterminal conference circuit, means responsive to the answering of all of said calls initiated by said conference program circuit for providing an answering signal, and means for maintaining said answering signal until all of the calls initiated by said conference program circuit have been terminated.

11. In combination in a telephone switching system, a plurality of switching stations, switching networks located thereat, a multiterminal conference circuit, a conference program circuit, means responsive to said conference program circuit for initiating calls for predetermined terminals at said conference circuit, means for transmitting signals from said conference program circuit for each of said calls for establishing a connection from said predetermined terminals through said switching network at said one switching station, and means for transmitting other signals from said conference program circuit for controlling the switching networks at other of said switching stations for extending calls from said conference program circuit through said other switching networks.

12. In combination in an automatic telephone switching network, a conference call initiating subscribers' stations, a plurality of other subscribers' stations, a plurality of switching stations each including a switching network interconnected with said subscriber's station, a multiterminal conference circuit located at the station to which said conference call initiating subscriber station is interconnected, a conference program circuit also located at said switching station, means responsive to conference call initiating signals transmitted from said conference call initiating subscribers' stations for selectively interconnecting one terminal of said multiterminal conference circuit with said conference call initiating subscriber's station and for operating said conference program circuit, means controlled by said conference program circuit for thereafter initiating a plurality of calls individual to each of a plurality of terminals of said multiterminal conference circuit, means responsive to each of said calls for establishing a communication path from the respective terminals of said multiterminal conference circuit through said switching network, and means responsive to other signals transmitted by said conference program circuit for establishing connections through other of said switching networks at other of said switching stations.

13. In combination in a telephone switching system, a multiterminal conference circuit, a single set of input terminals and a plurality of sets of output terminals for said multiterminal conference circuit, a plurality of selectable sets of terminals for selecting said single set of input terminals of said multiterminal conference circuit, a plurality of conference program circuits one individual to each of said sets of terminals, means responsive to the selection of any of said sets of terminals for initiating the operation of the conference program circuit individual thereto, and means controlled by said conference program circuit for thereafter initiating calls for said output terminals.

14. In combination in a telephone switching system, a subscriber's station, a switching station including a switching network, means at said subscriber's station for transmitting calling signals for controlling said switching network, a plurality of sets of selectable terminals included in said switching network, a conference bridge circuit, having a single set of input terminals connected to said plurality of selectable contacts and a plurality of sets of output terminals, a plurality of conference program circuits one individual to each of said sets of selectable terminals, means responsive to the predetermined calling signals transmitted from said subscriber's station for selecting different sets of said plurality of selectable contacts, means responsive to the selection of any of said sets of terminals for initiating the operation of the conference program circuit individual thereto, and means controlled by said conference program circuit for thereafter initiating calls for said output terminals.

References Cited by the Examiner

UNITED STATES PATENTS

| | | | |
|---|---|---|---|
| 2,185,287 | 1/40 | Beaumont | 179—18 |
| 2,852,612 | 9/58 | Baker et al. | 179—18 |
| 2,891,114 | 6/59 | Villman et al. | 179—90 |
| 2,951,908 | 9/60 | Malthaner et al. | 179—90 |

ROBERT H. ROSE, *Primary Examiner.*

WALTER L. LYNDE, *Examiner.*